July 13, 1926. 1,592,182
J. B. DAVIDSON ET AL
DYNAMOMETER
Filed June 16, 1924 2 Sheets-Sheet 2
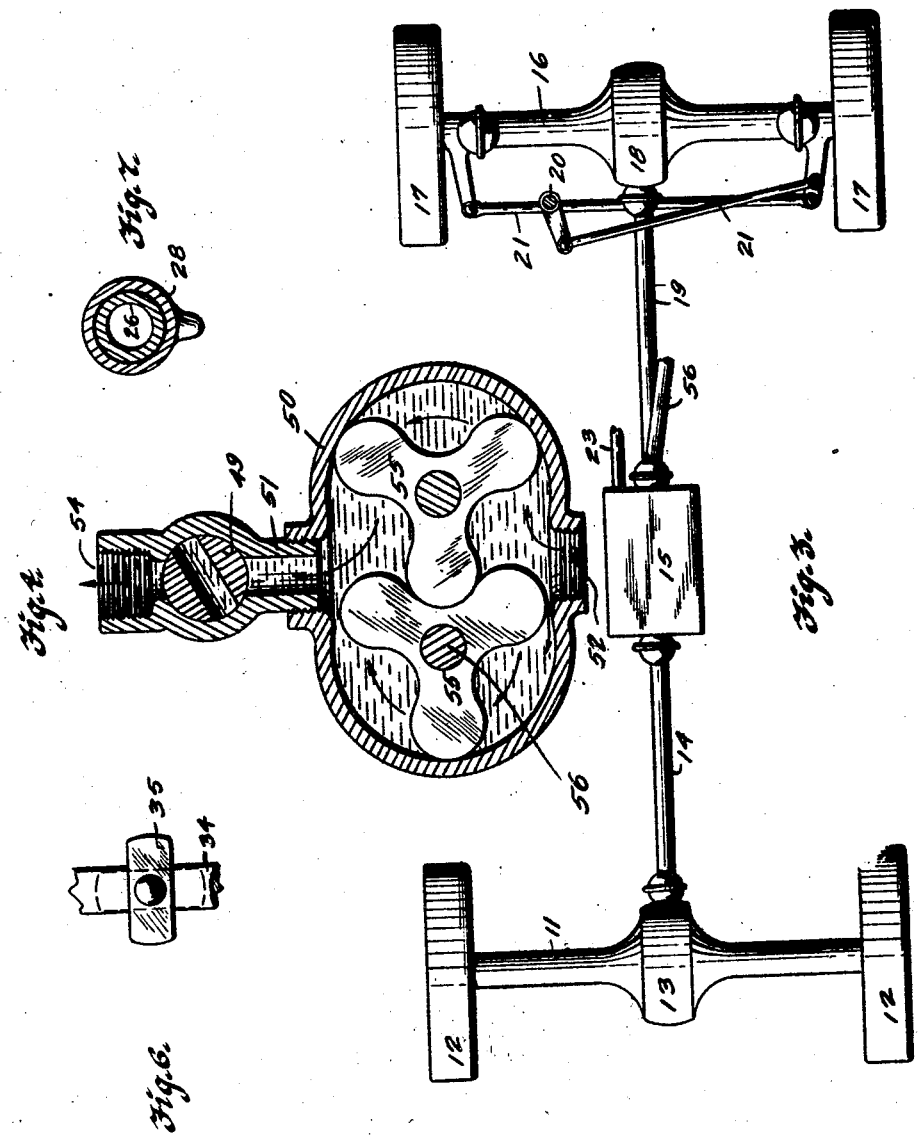

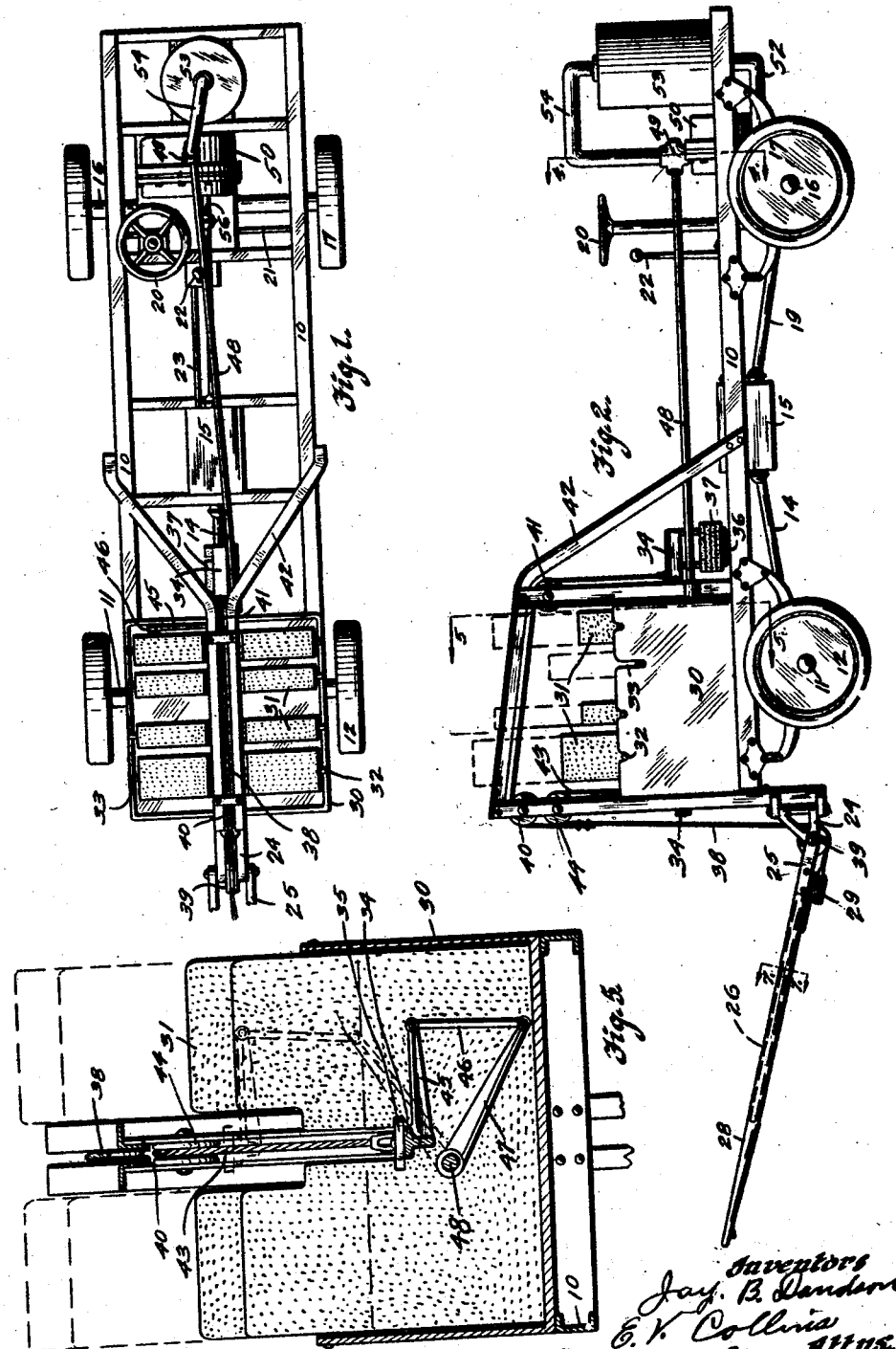

Patented July 13, 1926.

1,592,182

UNITED STATES PATENT OFFICE.

JAY BROWNLEE DAVIDSON AND EDGAR V. COLLINS, OF AMES, IOWA, ASSIGNORS TO IOWA STATE COLLEGE OF AGRICULTURE AND MECHANIC ARTS, OF AMES, IOWA, A CORPORATION OF IOWA.

DYNAMOMETER.

Application filed June 16, 1924. Serial No. 720,362.

The object of our invention is to provide a dynamometer of simple, durable and inexpensive construction especially designed for testing the continued or sustained tractive power of draft animals, traction engines and so forth, and capable of being operated in a convenient and facile manner.

More specifically it is our object to provide a dynamometer which, when in use is advanced over the road surface by draft animals and so forth and in which the amount of tractive force, being applied at any given period during the progress of the dynamometer over a road surface, may be readily and easily seen and determined by the operator at all times, and also to provide a dynamometer of this character in which the amount of tractive force being applied to move the dynamometer may be varied by the operator conveniently and easily when the dynamometer is being advanced over a road surface or when it is stationary.

A further object is to provide a dynamometer of this character in which the amount of tractive force being applied may be accurately ascertained and determined at all times, regardless of the amount of tractive force lost by friction, and also regardless of the tractive force being lost through variable road conditions.

A further object is to provide a dynamometer of this character which, in addition to its accurate measurement of the tractive force being applied, is so constructed and arranged that it will embody in addition a valuable entertainment interest.

Our invention consists in the construction, arrangement and combination of the various parts of the device, whereby the objects contemplated are attained, as hereinafter more fully set forth, pointed out in our claims, and illustrated in the accompanying drawings, in which:

Figure 1 shows a top or plan view of a dynamometer embodying our invention.

Figure 2 shows a side elevation of the same.

Figure 3 shows a top or plan view of the running gear of the vehicle with the body removed.

Figure 4 shows an enlarged, detail, sectional view on the line 4—4 of Figure 2.

Figure 5 shows an enlarged, transverse, sectional view taken on the line 5—5 of Figure 2.

Figure 6 is an enlarged detail view of the latch device for connecting the weights to the movable beam; and Figure 7 shows an enlarged, detail, sectional view of the vehicle tongue taken on the line 7—7 of Figure 2.

Referring to the accompanying drawings, we have used the reference numeral 10 to indicate an automobile truck platform which may be supported upon a running gear of any ordinary type. In the present embodiment of our invention, the front axle is indicated by the numeral 11 and has supporting wheels 12 mounted thereon. The front axle travels through a differential gear 13 of any ordinary type, driven from a shaft 14 which connects to a transmission and differential gear device 15. The rear axle 16 is provided with steerable wheels 17 and is also provided with a differential gear 18 driven from the shaft 19, which in turn is driven from the transmission gear device 15. The wheels 17 are steered through the steering wheel 20 and the ordinary steering connections 21. A gear shift lever 22 is provided connected by a shaft 23 with the transmission 15.

All of the parts just described are of the ordinary form now in common use in four-wheeled drive ordinary trucks, and of themselves form no part of our present invention, and are not herein specifically illustrated or described in detail.

At the end of the truck adjacent to the wheels 12 is a bracket 24 pivotally supported to move laterally. To this bracket there is a vehicle tongue section 25 pivotally mounted to move up and down. This part 25 is provided with a rounded tongue member 26, as shown in Figure 7, and a telescoping tongue member 28 is slidingly mounted on it. Connected to the tongue member 28 is a doubletree 29 to which draft animals may be hitched. In this connection, attention is called to the fact that we have arranged for hitching draft animals to the end of the truck which is normally considered as the rear end, and the steering wheels are, therefore, arranged in our device at the rear of the truck.

Mounted upon the truck platform 10 at the end adjacent to the tongue is a receptacle 30 in which we have mounted a number of weights 31. These weights are preferably provided with outwardly projecting pins 32, which normally rest in slots 33 formed in the sides of the receptacle 30, which tend to keep the weights from tilting.

In the central portion of each set there is formed a vertical slot extending from the top downwardly, and provided with notches at their lower ends, which notches extend laterally, as clearly shown in Figure 5, and projecting through all of these slots is the weight supporting beam 34. Mounted upon this beam for each of the weights is a turn button 35, shown in Figures 5 and 6. These turn buttons, as clearly shown in Figure 6 are of oblong shape with their ends rounded. When they are in the position shown in Figure 6, then these rounded ends project into the notches in the weights, as shown in Figure 5, but when they are turned at right angles, as indicated by dotted lines in Figure 6, these turn buttons do not engage the weights but are free to move up and down in the slots in the weights. Mounted on one end of the beam is a hanger device 36 upon which small weights 37 may be detachably received.

For raising the weights by a pull upon the doubletree 29, we have provided a cable 38 attached to the doubletree and passed under a pulley 39 on the rear end of the tongue. This cable extends upwardly over two pulleys 40 and 41 which are supported in an elevated frame 42. One end of the cable is attached to the beam 34 near its rear end, and a second cable 43 is attached to the cable 38 and passed over a pulley 44 and extended down and connected to the opposite end of the beam 34. Hence, when the doubletree is moved forwardly, the beam 34 and any weights carried by it will be elevated.

For the purpose of locking the truck wheels against rotation when the beam 34 is at its lower limit of movement, and for unlocking them to permit free rotation when the beam 34 is elevated, we have provided the following mechanism:

Fixed to the beam 34 is an arm 45 extended laterally, and connected with this arm is a link 46, which link is in turn connected to an arm 47 fixed to a rotatable shaft 48. This shaft 48 extends rearwardly over the truck platform, and has its rear end connected to an ordinary cut-off valve 49, shown in Figure 4. The parts are so arranged that when the beam 34 is in its lower position of movement, the valve 49 will be in a closed position, and as the beam is elevated, the valve 49 will be moved to open position.

This valve 49 is in communication with a rotary pump casing 50, communicating at its top with a pipe 51 in which the valve 49 is mounted, and communicating at its bottom with a pipe 52, which in turn communicates with a tank 53 mounted upon the truck platform. This tank 53 at its top communicates with a pipe 54, which is in communication with the upper end of the valve 49. Within the pump casing 50 are two co-operating rotary pump blades 55 of the type now in common use, one of which is fixed to a shaft 56, which shaft is extended into the transmission gear and is in gear with the transmission mechanism of the truck. These parts are so arranged that when the beam 34 is at its lower limit of movement, the valve 49 is closed and the liquid contained within the rotary pump is held against circulation by the valve 49; and since the rotary pump is in gear with the truck transmission, obviously the transmission is locked and the truck cannot move. When the beam 34 is elevated to wholly or partially open the valve 49, then the liquid contained within the rotary pump may circulate, and tractive force applied to the truck by draft animals or otherwise, will result in the movement of the truck over the road surface. During this movement, if at any time the beam 34 is lowered, the circulation through the rotary pump will be stopped and the transmission again locked.

In practical use, and assuming, for the purpose of illustration, that the device is being used in testing the pulling power of draft animals, then the truck is moved to the selected road for performing the test, and the draft animals are attached to the doubletree 29. Then the operator ascertains the approximate amount of weight that should be lifted by the draft animals for test purposes, and moves the turn buttons 35 on the beam 34 to connect the selected weights to the beam. When the draft animals start to pull, the truck wheels are locked against rotation, and all of the tractive force applied by the draft animals is exerted in elevating the beam 34 and its attached weights. As soon as these weights are elevated, then the valve 49 is opened and the truck transmission gearing is unlocked, and the truck is free to be moved along the roadway. During this advance movement of the truck, and if at any time the draft animals should exert less than enough tractive force to retain the selected weights in their elevated position, then the weights will drop by gravity upon the truck platform, and close the valve 49, thereby locking the transmission mechanism.

During the advance of the dynamometer over the road surface, the speed of the rotary pump may be regulated by manipulating the transmission control lever 22 and changing the gear ratio as in an ordinary automobile truck. Furthermore, during the advance of the dynamometer, it may be steered as desired by manipulating the steering wheel, and this arrangement of steering the rear instead of the front wheels and having the tongue mounted to swing laterally without effecting the steering, accomplishes the useful function of permitting the draft animals to have a certain freedom of movement laterally without effecting the steering, and at the same time the operator may easily control the general direction of advance of the truck.

One of the important advantages of our invention is that the continuous and sustained tractive power applied by the draft animals is approximately measured by the amount of the weights being elevated, and this is regardless of the amount of friction of the operating parts or the amount of draft necessary to advance the truck over the road surface. In other words, regardless of road conditions.

For example, let it be assumed that it is desired to ascertain whether or not a certain draft animal or animals can start and continuously exert a tractive force of two tons, and let it be assumed further that there is a loss by friction of the working parts of the device, and due to road conditions, of five hundred pounds, or in other words, that it would require a pull of five hundred pounds to advance the dynamometer over the road surface; under such conditions it is obvious that since the truck wheels are locked at the start, substantially the entire tractive force applied by the draft animals will first be utilized in raising the weights so that the amount of said weights accurately determine the tractive force necessarily applied in starting the dynamometer.

After the dynamometer has started to move over the road surface, and continuing the assumption that it would require a tractive force of five hundred pounds applied by the draft animals for the purpose of moving the vehicle over the road surface, then so long as the draft animals exert enough tractive force to keep the weights elevated, the amount of tractive force required to advance the vehicle over the road surface and overcome friction is obviously taken away from the amount of tractive power required to maintain the weights in an elevated position.

For example, let it be assumed that the weights are in an elevated position and the draft animals stand immovable, then obviously the weights would descend, and during their descent the weights would advance the vehicle over the road surface, regardless of the amount of friction, up to the point where the amount of such friction would be equal to the amount of the tractive force required to maintain the weights elevated. Hence, the amount of weights attached to the beam is, under all road conditions and under varying amounts of friction, a true and accurate measurement of the tractive force being continuously applied to the dynamometer by the draft animals.

As a practical illustration of one manner in which our device may be advantageously employed in determining the tractive power of draft animals, let it be assumed that several teams of draft animals are selected for testing purposes, and that the dynamometer is so set that the device cannot be advanced over the ground until, say for instance, two of the weights have been elevated by the draft animals, and assuming further that the competitive test is to be conducted over a measured course of, say for instance, twenty-seven and one-half feet. Under such circumstances, then the respective teams of draft animals that are being compared are successively hitched to the dynamometer and made to first raise the weights and then advance over this measured course. Even if all of the teams have no great difficulty in first raising the weights, obviously the team having the most tractive power will advance the dynamometer over the measured course in the shortest space of time, and in this manner an accurate comparison or test of the respective tractive power of the various teams of draft animals may be accurately ascertained.

It is advantageous in a device of this kind to have the valve which controls the locking and unlocking of the traction wheels so arranged that it will be opened only slightly when the weights commence to elevate, and more fully as the weights are further elevated, for the reason that when the draft animals exert enough tractive force to commence the elevation of the weights, then if the vehicle were permitted to freely advance, the draft animals will not be able to get into their natural pulling stride before the vehicle commenced to advance rapidly, and hence the weights would descend and again apply the lock to the wheels, but by having the control valve slowly as the weights commence to elevate, then the draft animals are given an opportunity to acquire their natural stride and gait. Furthermore, in this connection, if after the draft animals have acquired their natural pulling stride, they should temporarily relax, and pull slowly then the progress of the vehicle would not be instantly stopped, but will be permitted to move slowly until the draft animals can again apply enough power to maintain the weights elevated.

By this arrangement, and taking into consideration the fact that the tractive pull of the draft animals is subject to considerable variation, and the resistance to the progress of the device over the road surface is also subject to variations on account of the condition of the road surface, the operation of the valve 49 will tend to maintain the weights substantially midway between their upper and lower limits of movement, because as the weights move upwardly, the valve will be more widely opened and less resistance will, therefore, be offered to the advance of the device over the road surface. In practice it has been found that a fairly well trained team of draft animals will be able to advance at a normal working stride with the weight of a predetermined amount over a predetermined length of travel, without at any time permitting the weight to descend to its lower limit or elevate it to its upper limit.

It is also advantageous in a device of this character to have a variable gear transmission so that when the weights are maintained in an elevated position, the vehicle may advance over the road surface at different speeds in proportion to the requirements of various tests, and the natural maximum speed of advance of the draft animals being tested under maximum pulling conditions. Certain draft animals or draft devices may operate at their maximum pulling efficiency at one speed of advance, and other draft animals or machines at a different or higher speed of advance. Hence, the desirability of having a variable speed transmission gear.

By having a series of weights arranged as herein shown, the operator may very readily, quickly and easily adjust the weights to the conditions required for the test; and furthermore by the arrangement herein shown, the amount of weights may be readily, quickly and easily varied either before the commencement of the test or during the test.

Furthermore, our improved dynamometer has proven to be very useful in the training of draft animals and we have found that by taking a given team of untrained draft animals and at first giving them only normal weights to draw and gradually increasing the weights on successive days, the draft animals readily learn to apply their weight, strength, skill and endurance in the most advantageous manner.

Our device is equally well adapted for testing the tractive pull of mechanical contrivances such as tractors.

In the following claims, we have used the term "weights" to apply to the elements which are raised by the draft animals prior to the advance of the machine over the road surface. However, we intend by said term to cover the equivalent of weights, such for instance as springs.

We claim as our invention:

1. In a dynamometer of the class described, the combination of a frame designed to be advanced over a road surface, a weight carried by the frame and capable of up and down movements relative thereto, means for applying tractive power to the weight and frame to elevate the weight and advance the frame, and means governed by the elevation of the weight relative to the frame for applying a variable resistance to the advance of the frame.

2. In a dynamometer of the class described, the combination of a frame designed to be advanced over a road surface, a weight carried by the frame and capable of up and down movements relative thereto, means for applying tractive power to the weight and frame to elevate the weight and advance the frame, and means governed by the elevation of the weight relative to the frame for preventing the advance of the frame until the weight has been elevated relative to the frame.

3. In a dynamometer of the class described, the combination of a frame designed to be advanced over the road surface, a weight carried by the frame and capable of being elevated relative to the frame, a cable connected with the weight and adapted to have tractive power applied to it to advance the frame and elevate the weight, and a pulley supported by the frame above the weight and having said cable passed over it.

4. In a dynamometer of the class described, the combination of a frame, supporting wheels therefor, a gearing mechanism operatively connected with a supporting wheel, means for locking the gear device against rotation, a weight carried by the frame, and capable of up and down movement relative thereto, means for applying a tractive power to the weight and frame to elevate the weight and advance the frame, and means for releasing said locking means upon an upward movement of the weight relative to the frame.

5. In a dynamometer of the class described, the combination of a frame, supporting wheels therefor, a gearing mechanism operatively connected with a supporting wheel, means for locking the gear device against rotation, a weight carried by the frame, and capable of up and down movement relative thereto, means for applying a tractive power to the weight and frame to elevate the weight and advance the frame, and means for releasing said locking means upon an upward movement of the weight relative to the frame, said means comprising a rotary pump operatively connected with the gear device, a valve for controlling the movement of a liquid through the pump, and means for operatively connecting the valve to the weight for opening and closing the valve on the up and down movements of the weight.

6. In a dynamometer of the class described, the combination of a frame, supporting wheels therefor, a beam capable of up and down movement relative to the frame, a cable and pulley device connected with the beam and so arranged that when tractive power is applied to said cable, it will tend to raise the beam and advance the frame, a series of weights carried by the frame and capable of up and down movement with respect to the frame, and means for detachably connecting said weights with the beam.

7. In a dynamometer of the class described, the combination of a frame, supporting wheels therefor, a gear device operatively connected with one of said supporting wheels, a rotary pump operatively connected with said gearing device, a valve for controlling the passage of liquid through the pump, a weight carried by the frame, and capable of being elevated relative thereto, means for applying tractive power to the weight and frame relative to the weight to raise the weight and advance the frame, and means controlled by the elevation of the weight relative to the frame for regulating the position of said valve, said parts being so arranged that when the weights are in their normal position, the valve will be closed and the frame locked against advance movement, and as the weights are gradually elevated relative to the frame, the said valve will assume a position partly open when the weight has been elevated a certain distance, and fully opened when the weight has been elevated a greater distance, for the purposes stated.

JAY BROWNLEE DAVIDSON.
EDGAR V. COLLINS.